US007917238B1

(12) United States Patent
Lapcevic

(10) Patent No.: US 7,917,238 B1
(45) Date of Patent: Mar. 29, 2011

(54) PORTABLE MUSIC DEVICE AND SYSTEMS

(76) Inventor: Thomas Lapcevic, Presto, PA (US)

( * ) Notice: Subject to any disclaimer, the term of this patent is extended or adjusted under 35 U.S.C. 154(b) by 1039 days.

(21) Appl. No.: 11/644,054

(22) Filed: Dec. 22, 2006

Related U.S. Application Data

(60) Provisional application No. 60/752,865, filed on Dec. 22, 2005.

(51) Int. Cl.
*G06F 17/00* (2006.01)

(52) U.S. Cl. .......................................................... 700/94

(58) Field of Classification Search ..................... 700/94
See application file for complete search history.

(56) References Cited

U.S. PATENT DOCUMENTS

| | | | | |
|---|---|---|---|---|
| 5,541,781 | A * | 7/1996 | Barr et al. | 386/66 |
| 5,820,384 | A * | 10/1998 | Tubman et al. | 434/308 |
| 6,771,568 | B2 * | 8/2004 | Hochendoner | 369/30.06 |
| 7,601,904 | B2 * | 10/2009 | Dreyfuss et al. | 84/600 |
| 2002/0188364 | A1 * | 12/2002 | Ota et al. | 700/94 |
| 2006/0251381 | A1 * | 11/2006 | Wickstead et al. | 386/46 |
| 2007/0065794 | A1 * | 3/2007 | Mangum | 434/307 A |
| 2007/0137463 | A1 * | 6/2007 | Lumsden | 84/603 |
| 2007/0156594 | A1 * | 7/2007 | McGucken | 705/51 |

* cited by examiner

*Primary Examiner* — Curtis Kuntz
*Assistant Examiner* — Paul McCord
(74) *Attorney, Agent, or Firm* — Reed Smith LLP

(57) ABSTRACT

A portable music device which integrates certain features of a personal music listening device with certain features of a personal audio recorder whereby a user can listen through headphones to a music selection containing both the instrumental score and/or integrated vocals. Utilizing the device, the user can sing through a microphone connected to the device while simultaneously listening to one or more parts of the music score/lyric tracks to create a music recording of the user's voice lyrics without recording the instrumental score and/or the integrated vocals. The portable music device may include or work with a system that includes features to procure, store and manage (both electronically and legally) copyrighted music.

13 Claims, 4 Drawing Sheets

PORTABLE MUSIC DEVICE AND SYSTEMS

CROSS-REFERENCE TO RELATED APPLICATION

This application claims the benefit under 35 U.S.C. §119 (e) of the earlier filing date of U.S. Provisional Application Ser. No. 60/752,865 filed on Dec. 22, 2005.

BACKGROUND OF THE INVENTION

1. Field of the Invention

The present invention relates generally to portable music devices and, more specifically, the present invention relates to mp3-style digital music devices including karaoke recording functionality as well as systems associated with the use of these devices.

2. Description of the Background

Portable music devices, such as mp3 players, have become an integral part of our society. These devices provide users with the opportunity to efficiently store many thousands of digital audio files and create customized play lists to suit individual preferences. The portability and wide array of available features make these devices widely used.

Another well-known aspect of society is that many people enjoy singing to music, especially when they can sing along with an artist. The popularity of karaoke machines in recent years has grown, providing average people the opportunity to sing along with their favorite stars and/or to various recordings of their favorite popular music. To date, however, there has been a need to provide a portable music device that incorporates certain functionality of common karaoke devices with the varied features of mp3 players while tracking and maintaining the legal rights (e.g. copyright) associated with the use and recording of the music.

SUMMARY OF THE INVENTION

In accordance with at least one preferred embodiment, the present invention integrates a portable playback and recording device that allows a user to listen to music selections through personal headphones while simultaneously singing into a microphone and creating a personalized recording that does not incorporate the music score of the original artist. The user then has the option to integrate her voice lyrics with various tracks of the underlying music, which, at the user's option, may include or exclude the vocal lyrics of the original artist. The result is an efficient and effective personal recording process that provides a user with the audio guidance of the original artist but results in a personalized recording that syncs and is in cue with the underlying instrumental score and vocal lyrics.

The present invention is also directed to systems for use with portable music devices described above, including systems for procuring, storing and managing (electronically and legally) the music and other recordings that may be associated with or created by the portable music devices of the present invention.

It is noted that although the preferred embodiments discussed herein are directed to portable music devices, the present invention is equally applicable to desktop and other computer systems. The portability is a preferred optional feature, but the ability to separate create, store, manage (electronically and legally) and share different versions/tracks of a single musical work is equally applicable to a desktop computer. The present invention, therefore, is not limited to portable devices.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein.

DETAILED DESCRIPTION

Figure 1:
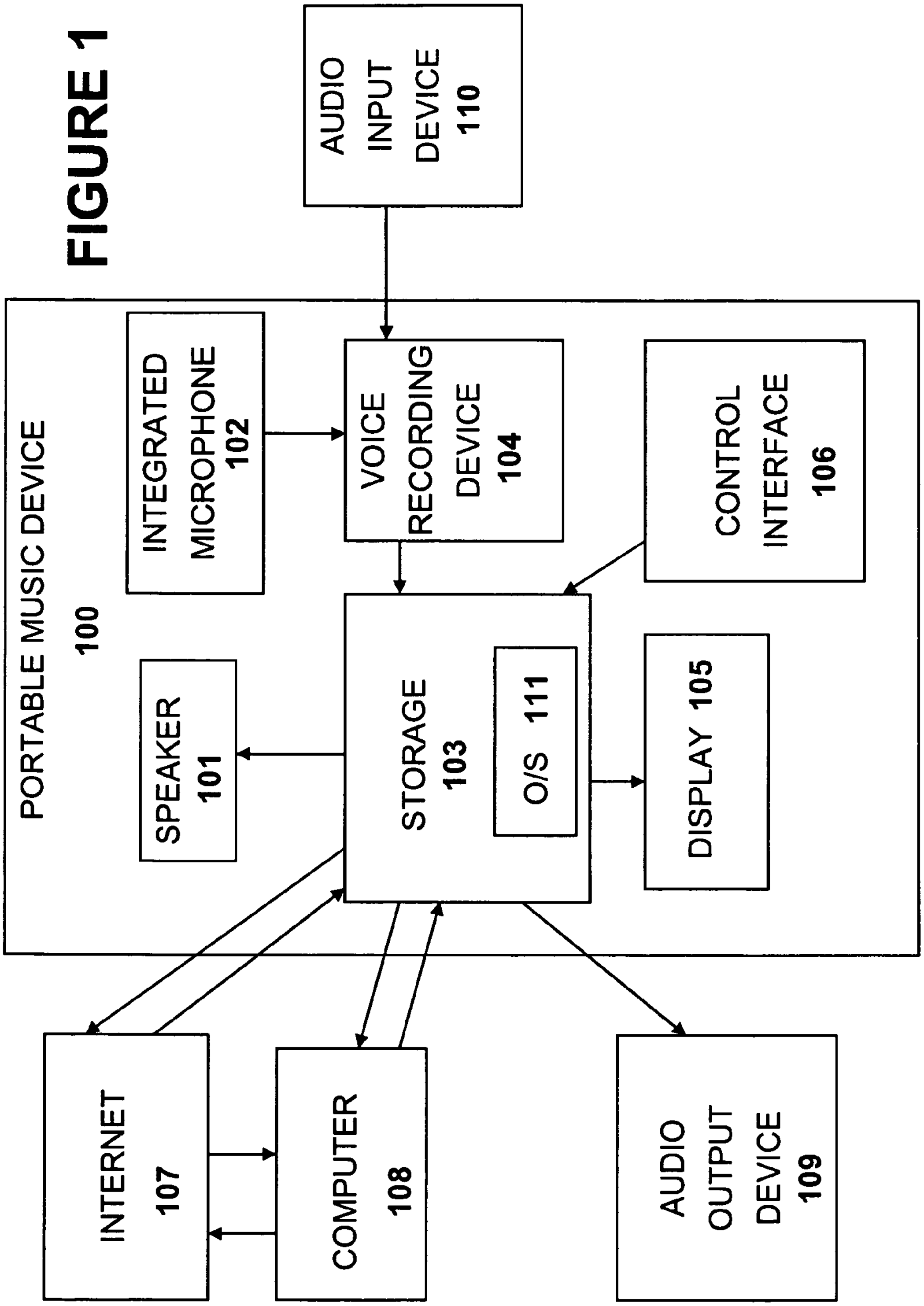
FIG. 1 shows a block diagram of an exemplary portable music device and associated components of an exemplary system for using a portable music device.

It is to be understood that the figures and descriptions of the present invention have been simplified to illustrate elements that are relevant for a clear understanding of the invention, while eliminating, for purposes of clarity, other elements that may be well known. Those of ordinary skill in the art will recognize that other elements may be desirable in order to implement the present invention. However, because such elements are well known in the art, and because they do not facilitate a better understanding of the present invention, a discussion of such elements is not provided herein. The detailed description will be provided herein below with reference to the attached drawings.

It is noted that although the preferred embodiments discussed herein are directed to portable music devices, the present invention is equally applicable to desktop and other computer systems. The portability is a preferred optional feature, but the ability to separate create, store, manage (electronically and legally) and share different versions/tracks of a single musical work is equally applicable to a desktop computer. The present invention, therefore, is not limited to portable devices.

Portable digital music playback devices are now common entertainment devices used by millions of individuals. These devices typically include a hard drive, flash memory or other storage device upon which many thousands of music and other audio selections (i.e., files), photographs and even video selections can be stored. These devices also typically include various control interfaces which provide a user with the ability to create and/or select from predefined play lists, adjust volume levels, pause or skip audio selections, fast-forward and rewind selections and various other control options. These devices also include a small viewing screen which can display song titles, artist names, photographs and videos.

Often, portable music devices communicate with a computer which is in turn connected to the Internet. This interface capacity provides a user with the ability to purchase and download audio and video selections over the Internet to the user's computer and then, in turn, to download the selections to the user's personal entertainment device. In essence, an individual user has almost instant access to millions of audio selections available over the Internet and is afforded an efficient means of downloading preferred selections and then arranging the playback of such selections through custom playback lists.

The present invention takes the personal digital entertainment experience to a new level of personal involvement and interaction by combining many of the features of personal portable music devices with both known and new features related to audio recording devices (such as karaoke machines).

For example, it is well known that many people sing along with the music they enjoy. For most people, singing in sync with the artist assists them in staying in cue and at remembering the lyrics. It is believed that many people would have a desire to create personalized yet professional recordings of themselves if there existed an efficient and simple means of listening to music, including the vocals associated with such music, while simultaneously recording their vocal lyrics in an independent manner that can be subsequently integrated with various versions of the underlying musical score.

Such a desire is believed to be even greater for a portable device that would provide such capabilities. Hence, there is strong appeal for a handheld digital device that would permit a user: (i) to select from the user's favorite music selections; (ii) to sing to the lyrics of the music score and to stay in cue by listening through headphones to an integrated music track containing the instrumental score, backup vocals and/or lead vocals; (iii) to have her vocals recorded onto the memory storage of the device as an independent digital file; and (iv) to have her lyrics integrated with a selected version of the underlying musical score, such as only the instrumental score or instrumental musical score with backup vocals. The result is a personalized recording that has been created with the benefits of listening and singing in sync with the original artist and with the ability to define which elements of the original music track, such as the underlying instrumental score, backup vocals and/or lead vocals, to integrate.

FIG. 1 is a block diagram showing an exemplary embodiment of the present invention that addresses one or more of these objectives by providing an integrated portable digital audio playback and recording device 100. The device preferably comprises all of the customary components of a personal audio playback device including a storage device 103 (e.g., hard drive, flash card), a control interface 106, and a display screen 105. Additionally, an external audio output device 109 (e.g., headphones, speakers) is preferably connected to the device 100. The device 100 may also include an integrated audio output device such as a speaker 101. The device 100 also preferably integrates a voice recording device 104, and a microphone 102. Additional audio input devices 110 (e.g., microphones, musical instruments) may also be connected to the device 100. Further, the device 100 may be connected to a computer 108 and/or the Internet 107. The device 100 also preferably includes an operating system 111 capable of maintaining, operating and synchronizing different versions of the same musical score.

For example, one version of a musical work may contain a complete track consisting of the instrumental score, backup vocals and lead vocals. A different version may contain only the instrumental score and backup vocals. Still another version may contain only the instrumental score. In each case, the operating system 111 of the device 100 and any companion hardware device, such as a computer 108, can manage all data associated with each version of the work. Such data may include synchronization data and legal data (such as copyright permissions) associated with each version. The operating system 111 of the device 100 also provides the user with the ability to select which version of the musical score she wants to listen to through headphones/speakers while making the recording.

Figure 2:
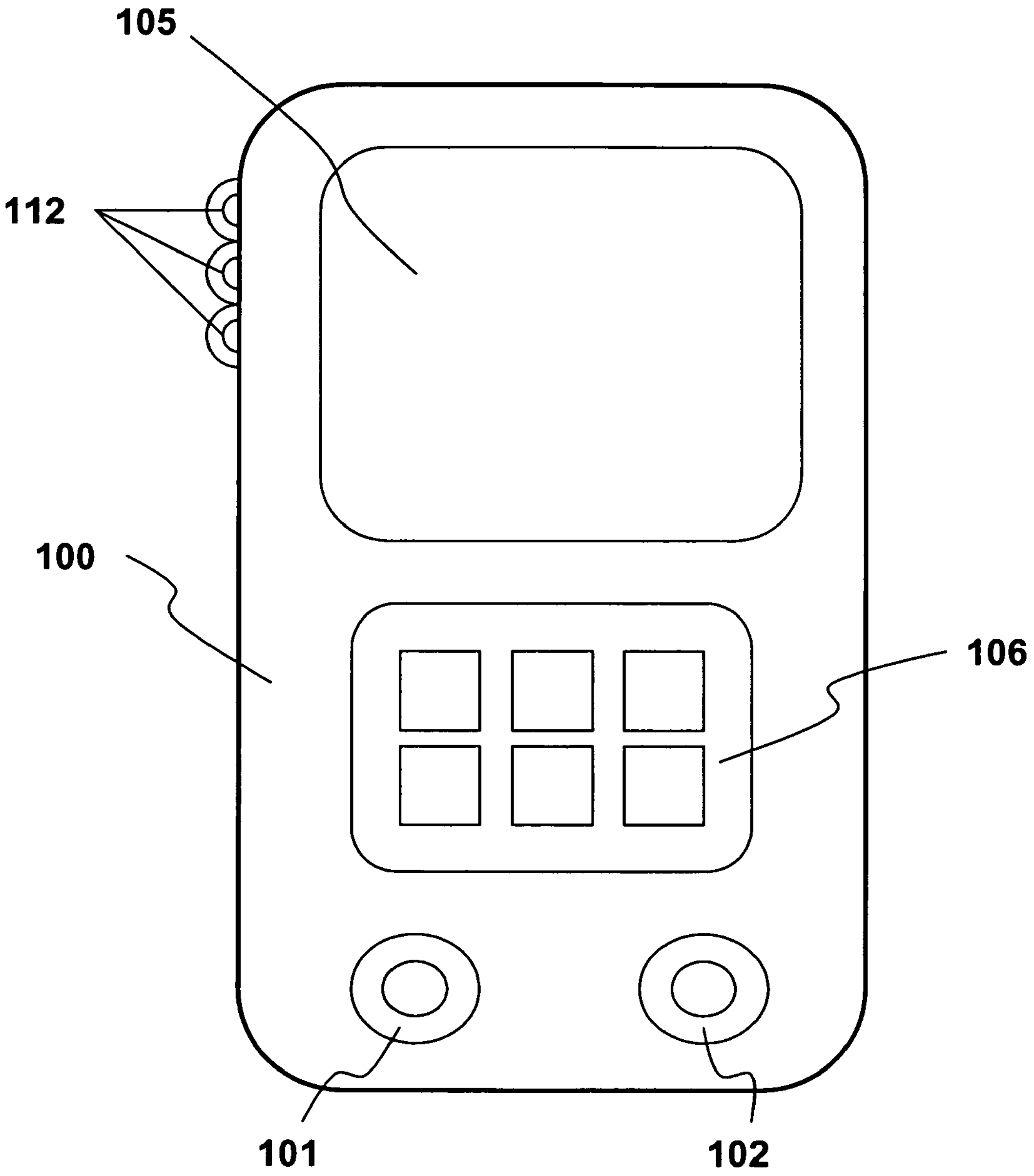
FIG. 2 shows an exemplary portable music device.

FIG. 2 shows an exemplary portable music device 100. The device 100 includes a display 105, control interface 106, integrated speaker for audio output 101, integrated microphone for audio input 102, and multiple input/output jacks 112. Input/output jacks 112 can be used to connect devices for transfer of audio data, such as microphones, musical instruments, headphones, speakers, or other audio devices. Input/output jacks 112 can also be used to connect other equipment such as a computer or modem for transfer of other data. Further, data can be transferred between device 100 and such audio or other equipment via wireless communications.

As a music recorder, the device allows the user to sing into an integrated or external microphone to create and store a digital recording of her vocal lyrics while listening to a version of a musical work. For example, the user may listen to a version of the music selection that contains all elements of a selection including the instrumental score, backup vocals and lead vocals. By listening to this selection, the user is put in cue and can benefit from listening to the entire track through headphones while singing into a microphone connected to the device. In one preferred embodiment, the device permits the user to record her voice without recording the musical work she is listening to through the headphones. The device preferably can record the user's voice in a variety of file formats, such as .mp3, .wav, .mpeg, or other formats.

The user may also interchangably listen to different tracks while listening and singing. For example, the user may start listening to a version of a song with the instrumental score and lead vocals, then switch in the middle of the song to a version without the lead vocals. This feature is accomplished through the use of time stamps or other synchronization methodologies employed for each of the pre-recorded or newly recorded tracks.

Once a personal recording is made, the user can overlay or integrate her vocals with any of the underlying versions of the musical score. With the user's voice lyrics now stored on the hard drive of the device as an independent digital file, the user can select an existing version with which to integrate her voice recording. For example, she may have her voice integrated with only the instrumental score, with the instrumental score and backup lyrics, or with the instrumental score, backup lyrics and primary lyrics.

In one embodiment of a portable device, multiple headphones and/or microphones are integrated into and/or connected to the device to support multiple simultaneous users. Hence, some users may be singing to the primary lyrics while others to the backup lyrics. This provides many possible combinations of recordings and dynamic integrations with the underlying versions of the musical work. The device may include a separate device that mixes the outputs and inputs to the main device. The device may also record data from each input as a separate file. Once the user has reviewed these various combinations, the user can create a new digital file which integrates her voice lyrics with any of the versions for which she has secured the legal authority to utilize for such purposes.

One beneficial feature of another preferred embodiment is the ability to display in a synchronized manner the lyrics (or other vocal input) or instrumental notes of the musical score being listened to through the headphones. Such displays may include any of the lyrics associated with the music selection, such as the backup lyrics or the lead lyrics, as well as the musical notes. In addition, lyrics or musical notes may be printed from the device or a companion hardware device such as a computer loaded with the operating system.

Another preferred feature of the invention is the time synchronization amongst the different versions of the musical score and any digital recording that is made in conjunction with any given version of the musical score. The manufacturer of the bundle of versions can synchronize every version of a given music score with one another (e.g., via time stamping). This data, in turn, creates the normative synchronization track for any personal recording made using any version of the original music score. Since the synchronization is based upon the data contained in the manufactured bundle and is not unique to any device or any given user, synchronization can occur across different users using different devices at different times and at different locations.

In addition, the same user can make many different personal recordings at many different times, even on different devices, and can be assured that each personal recording is synchronized with every other recording and every version of the underlying music score. This provides users the ability to effectively and efficiently overlay or merge any of their own personal recordings, and even the personal recordings of other users, with any of the underlying versions of the music score while being assured that the various elements of the integration are all in synchronization with one another.

Another feature of a preferred embodiment of the device is the ability to simultaneously pause the playback of the device and any associated personal recording and mark the personal recording for purposes of dubbing together different "partial" personal recordings (that may be made at different times). The user can rewind the playback of any version of the musical score to a precise point so the user can recommence listening to the musical score while starting a new recording. The dubbing of the different recording can be automatically accomplished by marking the ending and staring points of each recording. This is effectively and efficiently accomplished due to the timing synchronization of each file as addressed above.

Another preferred embodiment of the invention has the ability to produce a new creative work by merging different personal recording files with any of the underlying versions of the music score. To facilitate this, the device is able to transfer and manage many different personal recordings associated with any given music score even if such personal recordings are made on different devices by different users. Again, this ability is attributed to the management of synchronization data as outlined above. This feature would permit individuals in different parts of the world using different devices but the same musical score to independently produce different personal recordings and then transfer them to each other so that either individual could then playback the other's personal recordings on her device and overlay them with any version of the underlying music score or even to create new digital files by merging any of the personal recordings with any of the versions of the music score.

For example, one individual may sing the backup vocals while the other sings the lead vocals. By transferring each individual's personal recording to the other individual, either individual could then merge the two personal recordings with the underlying instrumental score to create a new collaborative creative work incorporating each of their vocal lyrics. The device may facilitate such transfers through Internet connectivity or postings through either the device itself or through compatible hardware devices such as computers that operate the same operating system as the device.

Yet another preferred feature of the device is the ability to integrate visual images, such as photos and videos, with the playback of the user's personal recordings and any integrated version of the music score. Again, this process is facilitated by the management of the synchronization data as outlined above.

The device may also integrate instrumental scores along with or in lieu of vocal lyrics. Such instrumental files are managed and operated in the same manner as files of vocal lyrics including the management of synchronization data, dubbing, playback and overlays as addressed above for vocal lyrics. Users desiring to insert instrumental scores may elect to view the synchronized musical notes of a selection as opposed to the lyrics of the selection. A preferred embodiment of the device can record audio input from devices other than a microphone. For example, the device may receive input from a computer or from a musical instrument, such as a keyboard, guitar, or bass.

Another embodiment of the device may also integrate other forms of vocal input, such as instructional input to facilitate the education and progression of musical artists, along with the instrumental scores or vocal lyrics. Such instrumental files are managed and operated in the same manner as files of instrumental and vocal lyrics including the management of synchronization data, dubbing, playback and overlays as addressed above for vocal lyrics.

Preferred embodiments of the present portable music device and its operating system also include the ability to facilitate an efficient and legal means of purchasing and managing bundles of versions of the same musical work for purposes of listening to such versions and integrating them with the personal recordings created by the user. For example, the purchase of a given bundle may consist of the instrumental score, the instrumental score with backup vocals, and the instrumental score with backup vocals and lead vocals. The operating system of the device recognizes and manages the different legal rights that may be associated with listening to a given version versus the manipulation or integration of each such version into a new creative (derivative) work. By this functionality, a user may purchase the legal rights associated with a given bundle that permits the user to listen to all of the versions in their original state. The user may also secure the legal rights to listen to an integrated playback of any of her personal recordings with any of the versions of the music score provided that are played back as independent files, essentially an overlay of tracks, provided that such is limited to playback on the device itself. Finally, the user may purchase and secure the legal rights to integrate her personal recordings with a given version(s) of the original music score to create a new integrated digital file constituting a new creative work.

For example, the user may integrate her lead vocals with the underlying instrumental score and backup lyrics to create a new digital file that has merged together each track. Essentially, two independent digital files are merged together to create one integrated digital file. The user can then transfer the new digital file, which may be an MPEG or similar file, to other types of playback or storage and playback mediums such as CDs or DVDs. In other words, the new file can now be shared and played back through a variety of mediums beyond the device itself. Overall, this legal data management system establishes a copyright encryption and management system and process that prohibits the manipulation of unauthorized tracks and derivative works incorporating given versions of the original musical score.

In yet another preferred embodiment of the present invention, the device or computer can display a graph plotting the voice pattern of the original artist which, along with the lyrics, can guide the user as she sings. The user can sing as her own voice pattern is simultaneously displayed, either independent from, alongside with and/or overlaid upon a graph of the original artist. This assists the user in being in cue and in sync with the original artist and the coordinated elements of the underlying instrumental score and lyrics. Once the user records her voice pattern, she can then request to search for other musical selections with vocal scores that are well suited for her voice. Such comparative information can be stored on the device, the computer or as a service through an online music store. Recommendations can then be made to the user based upon a comparison of the elements of the user's voice, such as range and pitch, with the elements of other musical selections.

Figure 3A:
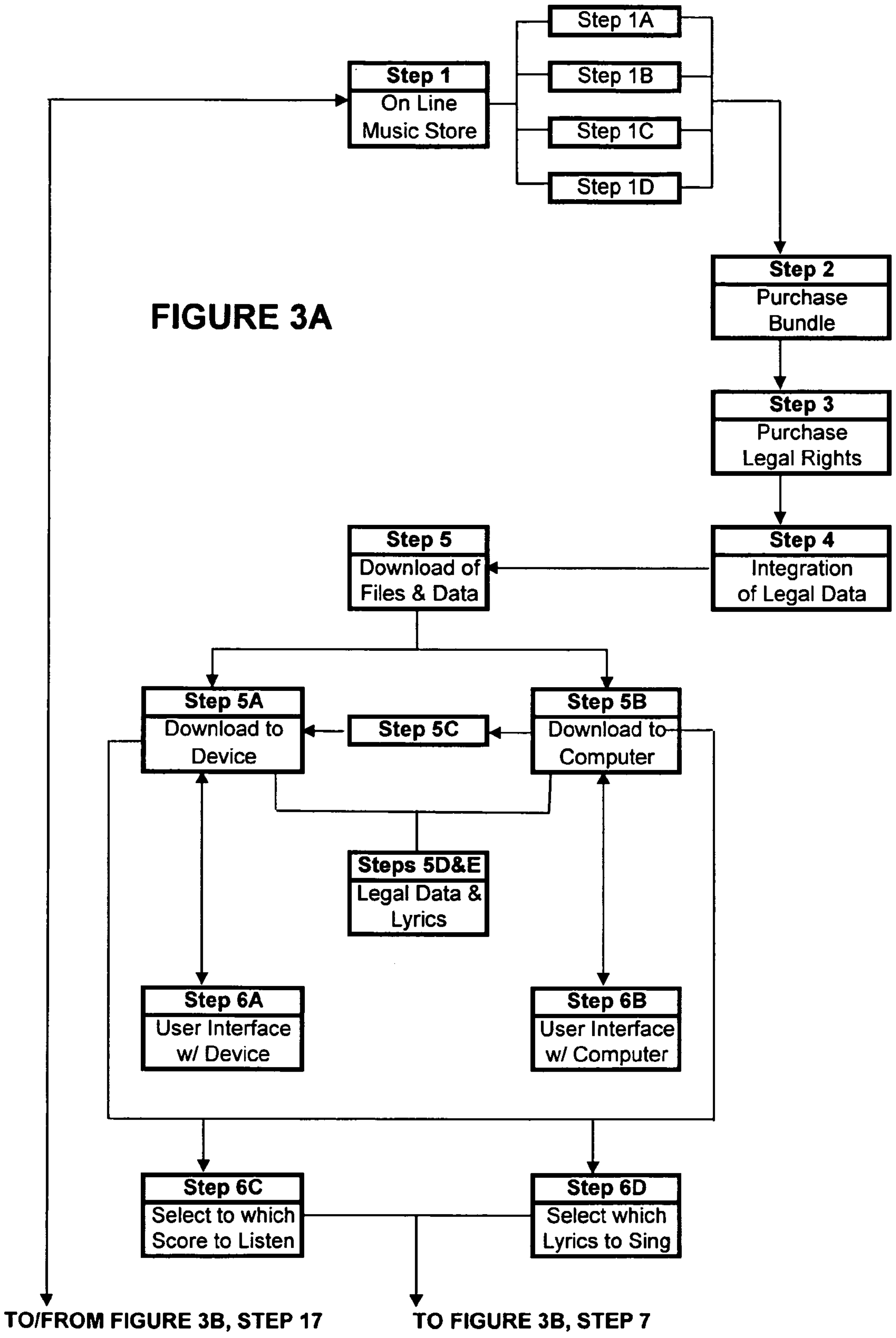
FIG. 3 is a flow diagram, beginning on FIG. 3A and concluding on FIG. 3B, illustrating an exemplary use of a system using a portable music device to make a personal audio recording and integrate the recording with other audio selections.
Figure 3B:
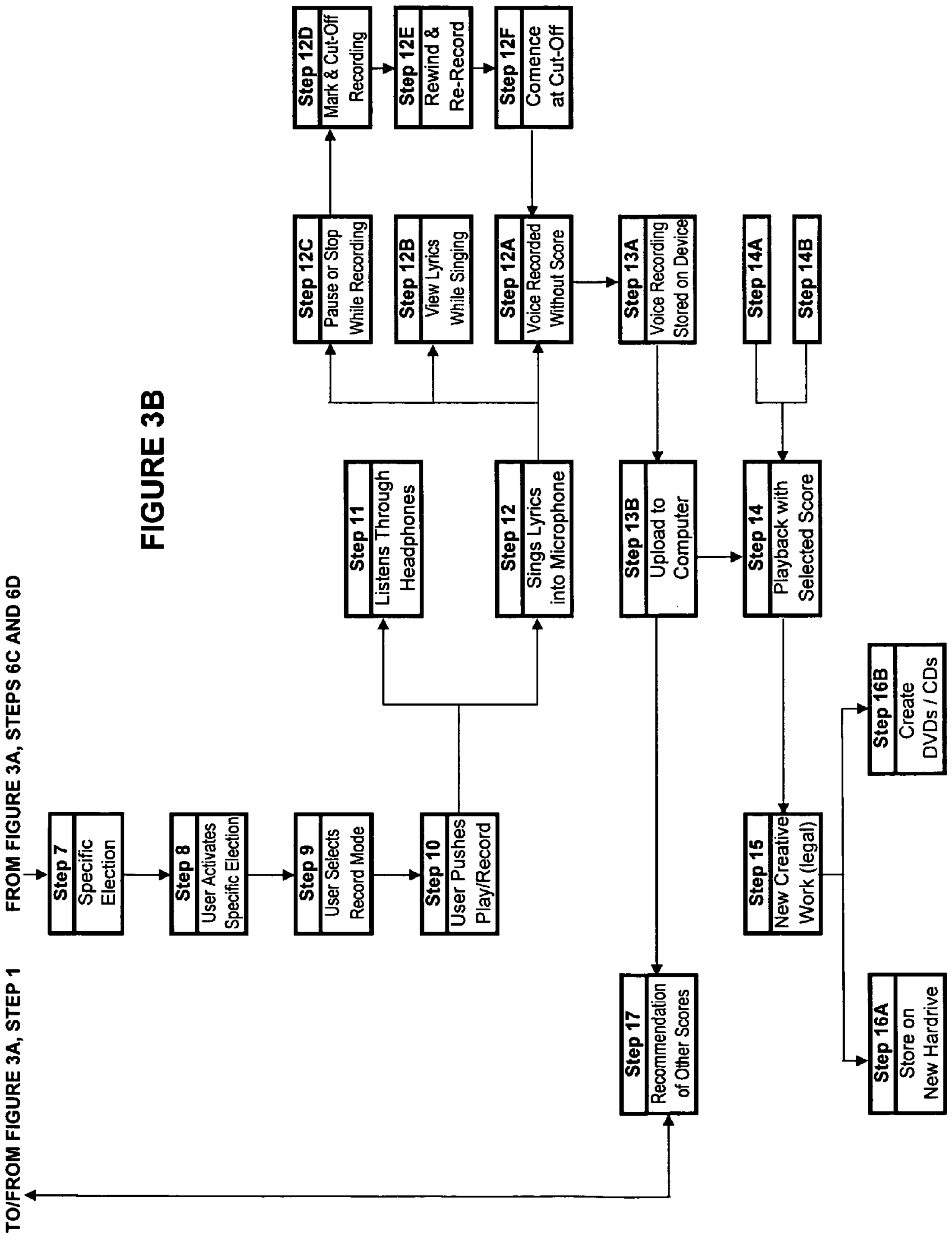

FIGS. 3A and 3B provide a flow chart of major elements of an exemplary use of a preferred system. In this embodiment, the user accesses via the Internet an online music store which is legally authorized to distribute a package of preferably at least four different versions of the same music selection (Step 1). The first version consists of a fully integrated music selection with an instrumental score, backup vocals and lead vocals (Step 1A). The second version consists of the instrumental score and backup vocals (Step 1B). The third version consists of the instrumental score and lead vocals (Step 1C). The fourth version consists of only the instrumental score (Step 1D).

The user purchases an appropriate bundle of versions (Step 2) and defines the type of legal rights she is purchasing with respect to the bundle of versions (Step 3). For example, she can purchase rights to overlay her voice on any one or all of the versions and create a new creative work depending upon her intended usage and the price she is willing to pay. For purposes of this example, she purchases the right to create a new creative work utilizing the version with only the instrumental score and the version with the instrumental score and backup vocals (Step 3). Hence, while she can listen to any of the versions in the bundle, she only has the right to create a new creative work out of two of the four versions. The legal rights associated with the permissible utilization of the different versions are integrated into the data associated with the various digital files (Step 4).

The user downloads the bundle of versions (Step 5) to either the device directly (Step 5A) or to a computer containing software which is compatible with the device (Step 5B) which in turn enables the computer to download the bundle of versions to the device (Step 5C). The device and/or computer stores the digital files and all data associated with the digital files including the legal rights associated with each file (Step 5D) and the lyrics associated with the backup vocals and lead vocals (Step 5E). Through an interface on the device (Step 6A) or on the computer (Step 6B), the user then selects which version from the bundle she wants to listen to (Step 6C) as she creates a voice recording of herself, or herself with others, singing the vocals that correspond with the underlying selection (Step 6D). Continuing to FIG. 3B, in this example, she elects to listen to the version containing all elements of the selection (i.e., the instrumental score, backup vocals and lead vocals) (Step 7).

Once the version is selected (and the data downloaded from the computer to the device if the selection is made on the computer), the user activates the specific selection on the device (Step 8) and selects the record mode on the device (Step 9). The user then pushes the play/record button on the device (Step 10) and listens through her headphones to the version she selected (Step 11) while she sings the lyrics through the microphone (Step 12). The user's voice is recorded on the device without recording the selection the user is listening to through the headphones (Step 12A). The user can be assisted with her recording by either viewing the backup lyrics or lead lyrics of the selection on either the screen of the device or of the computer or by having the lyrics printed from the device or computer (Step 12B).

Throughout the recording process, the user has the option of pausing or stopping the recording if she makes a mistake or sings off cue (Step 12C). The user can then review her voice recording and mark the point at which she wants the recording to be cut-off and commence re-recording (Step 12D). The user can then rewind the version she is listening to back to a point prior to the recording cut-off point (Step 12E). For example, the user may go back 10 seconds prior to her cut-off point to recommence singing so she can get back on cue (Step 12E). The underlying recording will not commence until she reaches her cut-off point (Step 12F).

Once the user completes singing the lyrics to the song, her personal recording is stored as an independent digital file on the device (Step 13A). The user can elect to repeat the steps above to create a different recording of different vocals. For example, she may want to perform the steps once to create lead vocals and a second time to create backup vocals. Alternatively, she may have different individuals sing either the lead vocals or the backup vocals. Each individual voice recording is stored on the device as a separate digital file with each such file containing synchronization data correlated with the underlying versions of the original piece of work. These files can be uploaded onto a computer (Step 13B).

With the user's personal vocal files now stored, the user can select to have her voice recording(s) played back in conjunction with any of the versions available in the bundle (Step 14). For example, she can have her voice recordings of her lead vocals and her backup vocals overlay the version from the bundle that contains only the instrumental score (Step 14A). Alternatively, she can have just her lead vocals overlay the version from the bundle that contains the instrumental score and the backup vocals (Step 14B). There are an almost limitless number of combinations that can be created and reviewed by combining different vocals with different original versions from the bundle. This playback of different combinations can be done directly by the portable device, or by a computer as shown in FIG. 3B.

Once the user has reviewed the various combinations, the user can access a user interface on either the device or the computer and elect to create a new digital file that merges her vocal lyrics with those versions from the bundle for which she has legal authority to create a new creative work (Step 15). In this example, she purchased rights to the instrumental score and the instrumental score with backup lyrics. The user is unable to merge any files that contain legal restrictions. Once new digital files are created that merge the user's vocal lyrics with the legally permitted original versions, the user can then transfer the digital files to different hardware devices (Step 16A) and even create CDs or DVDs of such files (Step 16B). If desired, the user can then seek recommendations for additional music selections that are well suited for the user's voice (Step 17).

The above process can be adapted to address multiple users in different parts of the world. Since each version and personal recording is synchronized, two people in different parts of the world can create personal recording files and then e-mail them to each other to create a collaborative creative work. For example, one user can create the lead vocals and others can create the backup vocals. Since all voice recordings are synced back to the original versions contained within the bundle, with each version itself being synced to each other version, the voice recordings can be created on different devices in different parts of the world and yet can be combined to create one integrated piece of creative work.

As previously noted, the present invention is equally applicable to desktop and other computer systems. The portability is a preferred optional feature, but the ability to separately create, store, manage (electronically and legally) and share different versions/tracks of a single musical work is equally applicable to a desktop computer. The present invention, therefore, is not limited to portable devices.

Through the above examples, various music devices and systems have been described. Nothing in the above description is meant to limit the present invention to any specific materials, geometry, or orientation of elements. Many part/orientation substitutions are contemplated within the scope of the present invention and will be apparent to those skilled in the art. The embodiments described herein were presented by way of example only and should not be used to limit the scope of the invention.

Although the invention is described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered only to facilitate comprehension of the invention and should not be construed to limit the scope thereof.

What is claimed is:

1. A portable audio device for recorded audio data, comprising:

a data storage device having a plurality of pre-produced audio tracks stored thereon, wherein said plurality of pre-produced audio tracks comprises:

a first audio track which comprises a musical score with lyrics; and a second said audio track which comprises said musical score with fewer of said lyrics;

an audio output device communicably connected to said data storage device, wherein the audio output device is configured for playing at least one of said stored audio tracks;

an audio input device; and a recording device communicably connected to said audio input device, wherein said recording device is configured to record audio received via said audio input device, and wherein said recorded audio is automatically synchronized with said first and second audio tracks through metadata when said audio is recorded while said audio output device is playing said first audio track;

wherein said portable audio device is configured to automatically combine said recorded audio with said second audio track to create a third audio track that is synchronized with said first and second audio tracks.

2. The portable audio device of claim 1, further comprising:

means to export said third audio track to an external storage device.

3. The portable audio device of claim 1, further comprising:

software configured for managing legal rights associated with said plurality of pre-produced audio tracks.

4. The portable audio device of claim 1, wherein said plurality of pre-produced audio tracks further comprises at least one additional audio track which comprises another musical score with lyrics.

5. The portable audio device of claim 1, wherein said audio input device is a microphone.

6. The portable audio device of claim 1, wherein said audio output device is headphones.

7. The portable audio device of claim 1, wherein said audio output device is a speaker.

8. A method of creating an audio recording using a portable audio device with a data storage device, comprising the steps of:

receiving and storing a plurality of pre-produced audio tracks, wherein said plurality of pre-produced audio tracks comprises:

a first audio track which comprises a musical score with lyrics; and a second said audio track which comprises said musical score with fewer of said lyrics;

playing said first audio track stored on said data storage device while simultaneously receiving audio input into said portable audio device;

recording said audio input as an input audio track, wherein said input audio track is automatically synchronized with said first and second audio tracks through metadata; and combining said input audio track with said second audio track to create a combined audio track, wherein said combined audio track is synchronized with said first and second audio tracks.

9. A system for selectively combining recorded audio data, comprising:

data storage means having a plurality of pre-produced audio tracks stored thereon, wherein said plurality of pre-produced audio tracks comprises:

a first audio track which comprises a musical score with lyrics; and a second said audio track which comprises said musical score with fewer of said lyrics;

audio output means communicably connected to said data storage means, wherein said audio output means is configured for playing at least one of said stored audio tracks;

a recording device communicably connected to said data storage means, wherein said recording device is configured to record audio received via an audio input means communicably connected to said recording device, and wherein said recorded audio is automatically synchronized with said first and second audio tracks through metadata when said audio is recorded while said audio output means is playing said first audio track; and software configured for combining said recorded audio with said second audio track to create a combined audio track, wherein said combined audio track is synchronized with said first and second audio tracks.

10. The system of claim 9, wherein said recorded audio is synchronized with said first and second audio tracks by time stamping.

11. The system of claim 9, further comprising:

software configured for managing legal rights associated with said plurality of pre-produced audio tracks.

12. The system of claim 9, further comprising:

a shared database of metadata related to said plurality of pre-produced audio tracks.

13. A portable audio device, comprising:

an operating system configured for:

managing a data storage device of the portable audio device, wherein said data storage device has a plurality of pre-produced audio tracks stored thereon, wherein said plurality of pre-produced audio tracks comprises:

a first audio track which comprises a musical score with lyrics; and a second said audio track which comprises said musical score with fewer of said lyrics;

managing an audio output device of the portable audio device;

managing an audio input device of the portable audio device;

managing a recording device of the portable audio device, wherein managing said recording device comprises:

recording audio received via said audio input device; and automatically synchronizing said first and second audio tracks with the recorded audio through metadata when said audio is recorded while said audio output device is playing said first audio track; and automatically combining said recorded audio with said second audio track to create a third audio track, wherein said third audio track is synchronized with said first and second audio tracks.

* * * * *